United States Patent
Kozubal et al.

(10) Patent No.: US 8,769,971 B2
(45) Date of Patent: Jul. 8, 2014

(54) INDIRECT EVAPORATIVE COOLER USING MEMBRANE-CONTAINED, LIQUID DESICCANT FOR DEHUMIDIFICATION

(75) Inventors: Eric Joseph Kozubal, Superior, CO (US); Steven Joseph Slayzak, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 763 days.

(21) Appl. No.: 12/864,071

(22) PCT Filed: Jan. 25, 2008

(86) PCT No.: PCT/US2008/052016
§ 371 (c)(1),
(2), (4) Date: Sep. 2, 2010

(87) PCT Pub. No.: WO2009/094032
PCT Pub. Date: Jul. 30, 2009

(65) Prior Publication Data
US 2010/0319370 A1    Dec. 23, 2010

(51) Int. Cl.
*F25D 17/06*    (2006.01)

(52) U.S. Cl.
USPC ............................................................. 62/92

(58) Field of Classification Search
USPC ................... 62/92, 94, 271, 314, 93, 304
See application file for complete search history.

(56) References Cited

U.S. PATENT DOCUMENTS

| 4,263,967 A | 4/1981 | McNab et al. |
| 4,544,513 A | 10/1985 | Otterbein |
| 4,976,113 A | 12/1990 | Gershuni et al. |
| 5,351,497 A | 10/1994 | Lowenstein |
| 5,493,871 A | 2/1996 | Eiermann |
| 5,638,900 A | 6/1997 | Lowenstein |

(Continued)

FOREIGN PATENT DOCUMENTS

| CN | 1044527 | 8/1990 |
| CN | 1918435 | 2/2007 |

(Continued)

OTHER PUBLICATIONS

Conde-Petit, et al, "Open Absorption System for Cooling and Air Conditioning Using Membrane Contactors—Final Report," Publication 280139, Jul. 8, 2008.

(Continued)

*Primary Examiner* — Melvin Jones
(74) *Attorney, Agent, or Firm* — John C. Stolpa

(57) ABSTRACT

An indirect evaporative cooler for cooling inlet supply air from a first temperature to a second, lower temperature using a stream of liquid coolant and a stream of exhaust or purge air. The cooler includes a first flow channel for inlet supply air and a second flow channel adjacent the first for exhaust air. The first and second flow channels are defined in part by sheets of a membrane permeable to water vapor such that mass is transferred as a vapor through the membrane from the inlet supply air to a contained liquid desiccant for dehumidification and also to the exhaust air as heat is transferred from the inlet supply air to the liquid coolant. A separation wall divides the liquid desiccant and the coolant but allows heat to be transferred from the supply air to the coolant which releases water vapor to the counter or cross flowing exhaust air.

20 Claims, 10 Drawing Sheets

(56) References Cited

U.S. PATENT DOCUMENTS

| | | | |
|---|---|---|---|
| 5,860,284 | A | 1/1999 | Goland et al. |
| 5,860,285 | A | 1/1999 | Tulple |
| 6,178,762 | B1 | 1/2001 | Flax |
| 6,247,604 | B1 | 6/2001 | Taskis et al. |
| 6,497,107 | B2 | 12/2002 | Maisotsenko |
| 6,514,321 | B1 | 2/2003 | Lehto et al. |
| 6,539,731 | B2 | 4/2003 | Kesten |
| 6,684,649 | B1 | 2/2004 | Thompson |
| 6,731,523 | B2 | 5/2004 | Jitaru |
| 6,739,142 | B2 | 5/2004 | Korin |
| 6,841,601 | B2 | 1/2005 | Serpico |
| 6,854,278 | B2 | 2/2005 | Maisotsenko |
| 7,197,887 | B2 | 4/2007 | Maisotsenko |
| 7,758,671 | B2 | 7/2010 | Kesten |
| 7,987,682 | B2 | 8/2011 | Reinders et al. |
| 2003/0014983 | A1* | 1/2003 | Maisotsenko et al. ......... 62/121 |
| 2003/0033821 | A1* | 2/2003 | Maisotsenko et al. ............ 62/94 |
| 2003/0106680 | A1 | 6/2003 | Serpico |
| 2004/0061245 | A1 | 4/2004 | Maisotsenko |
| 2004/0134212 | A1 | 7/2004 | Lee et al. |
| 2005/0109052 | A1 | 5/2005 | Albers et al. |
| 2005/0210907 | A1 | 9/2005 | Gillian et al. |
| 2005/0215728 | A1 | 9/2005 | Cao |
| 2007/0056309 | A1 | 3/2007 | Bhatti et al. |
| 2009/0236317 | A1 | 9/2009 | Yost et al. |
| 2010/0000247 | A1 | 1/2010 | Bhatti et al. |
| 2010/0031817 | A1 | 2/2010 | Ehrenberg |
| 2010/0048942 | A1 | 2/2010 | Knoesche |
| 2010/0092888 | A1 | 4/2010 | Buchine et al. |
| 2010/0248449 | A1 | 9/2010 | Hildreth et al. |
| 2010/0273901 | A1 | 10/2010 | Ehrenberg et al. |
| 2010/0319370 | A1 | 12/2010 | Kozubal et al. |
| 2011/0108406 | A1 | 5/2011 | Maisotsenko et al. |
| 2011/0120685 | A1 | 5/2011 | van Heeswijk et al. |
| 2011/0195652 | A1 | 8/2011 | Smith |
| 2011/0209858 | A1 | 9/2011 | Konno |
| 2012/0167600 | A1 | 7/2012 | Dunnavant |
| 2013/0010423 | A1 | 1/2013 | Carlson |

FOREIGN PATENT DOCUMENTS

| | | |
|---|---|---|
| JP | 59-066692 | 4/1984 |
| JP | 1099631 | 4/1989 |
| JP | 2002206834 | 7/2002 |
| JP | 147116 | 11/2005 |
| JP | 147117 | 6/2007 |
| JP | 206834 | 7/2007 |
| WO | 8706682 | 11/1987 |
| WO | 9002305 | 3/1990 |
| WO | 02080295 A2 | 10/2002 |
| WO | 2009094032 A1 | 7/2009 |
| WO | 2011016847 A2 | 2/2011 |
| WO | 2011161547 A2 | 12/2011 |
| WO | 2012047938 A2 | 4/2012 |

OTHER PUBLICATIONS

Conde-Petit, M., et al, "Open Absorption System for Cooling and Air Conditioning using Membrane Contactors," Publication 260098, Nov. 14, 2006.

Conde-Petit, M., et al, "Open Absorption System for Cooling and Air Conditioning using Membrane Contactors—Annual Report 2005," Publication 260097, Jan. 30, 2006.

Conde-Petit, M., "Liquid Desiccant-Based Air-Conditioning Systems," LDACS, Proc. of the 1st European Conference on Polygeneration—Technologies and Applications, 217-234, A. Coronas, ed., Oct. 16-17, 2007, Spain.

Conde-Petit, M., "Open Absorption System for Cooling and Air Conditioning using Membrane Contactors," Proceedings '15, Schweizerisches Status-Seminar <<Energie-und Umweltforschung im Bauwesen>>', Sep. 11-12, 2008, Switzerland.

H.T. El-Dessouky et al, A novel air conditioning system: Membrane air drying and evaporative cooling, IchemE, Chemical Research and Design, vol. 78, Iss 7, pp. 999-1009, Oct. 2000.

Faleh A. Al-Sulaiman et al, Liquid dessiccant based two-stage evaporative colling system using reverse osmosis (RO) process for regeneration, Applied Thermal Engineering, vol. 27, Iss 14-15, pp. 2449-2454, Oct. 2007.

International Search Report, dated Sep. 25, 2008, for International Application No. PCT/US08/52016.

International Preliminary Report on Patentability and Written Opinion of the International Searching Authority, dated Jul. 27, 2010, for International Application No. PCT/US2008/052016.

06-22JP, SN 544285/2010 Japanese OA dated Jun. 5, 2012.

06-22CN, SN 2008801282188 Chinese OA dated Mar. 6, 2013.

U.S. Appl. No. 13/886,131 US 371 non-provisional application and figures filed May 2, 2013.

U.S. Appl. No. 13/801,210 US non-provisional application and figures filed Mar. 13, 2013.

U.S. Appl. No. 13/801,395 US non-provisional application and figures filed Mar. 13, 2013.

Woods, et al., "A desiccant-enhanced evaporative air conditioner: Numerical model and experiments," Energy Conversion and Management, 65 SI, pp. 208-220, Jan. 2013.

Kozubal, et al., "Desiccant Enhanced Evaporative Air-Conditioning (DEVap); Evluation of a New Concept in Ultra Efficient Air Conditioning," Jan. 2011.

Kozubal, et al., "Devleopment and Analysis of Desiccant Enhanced Evaporative Air Conditioner Prototype," Apr. 2012.

* cited by examiner

US 8,769,971 B2

INDIRECT EVAPORATIVE COOLER USING MEMBRANE-CONTAINED, LIQUID DESICCANT FOR DEHUMIDIFICATION

CONTRACTUAL ORIGIN

The United States Government has rights in this invention under Contract No. DE-AC36-99GO10337 between the United States Department of Energy and the National Renewable Energy Laboratory, a Division of the Midwest Research Institute.

BACKGROUND

Air conditioning is used worldwide to provide comfortable and healthy indoor environments that are properly ventilated and cooled and that have adequate humidity control. While being useful for conditioning supply air, conventional air conditioning systems are costly to operate as they use large amounts of energy (e.g., electricity). With the growing demand for energy, the cost of air conditioning is expected to increase, and there is a growing demand for more efficient air conditioning methods and technologies. Additionally, there are increasing demands for cooling technologies that do not use chemicals and materials, such as many conventional refrigerants, that may damage the environment if released or leaked. Maintenance is also a concern with many air conditioning technologies, and, as a result, any new technology that is perceived as having increased maintenance requirements, especially for residential use, will be resisted by the marketplace.

Evaporative coolers are used in some cases to address air conditioning demands or needs, but due to a number of limitations, conventional evaporative coolers have not been widely adopted for use in commercial or residential buildings. Evaporative coolers, which are often called swamp coolers, are devices that use simple evaporation of water in air to provide cooling in contrast to conventional air conditioners that use refrigeration or absorption devices using the vapor-compression or absorption refrigeration cycles. The use of evaporative cooling has typically been limited to climates where the air is hot and humidity is low such as in the western United States. In such dry climates, the installation and operating costs of a conventional evaporative cooler can be lower than refrigerative air conditioning. Residential and industrial evaporative coolers typically use direct evaporative cooling with warm dry air being mixed with water to change the water to vapor and using the latent heat of evaporation to create cool moist air (e.g., cool air with a relative humidity of 50 to 70 percent). For example, the evaporative cooler may be provided in an enclosed metal or plastic box with vented sides containing a fan or blower, an electric motor to operate the fan, and a water pump to wet evaporative cooling pads. To provide cooling, the fan draws ambient air through vents on the unit's sides and through the dampened pads. Heat in the air evaporates water from the pads, which are continually moistened to continue the cooling process. The cooled, moist air is then delivered to the building via a vent in the roof or a wall.

While having an operation cost of about one fourth of refrigerated air conditioning, evaporative coolers have not been widely used to address needs for higher efficiency and lower cost conditioning technologies. One problem with many sump coolers is that in certain conditions these evaporative coolers cannot operate to provide adequately cooled air. For example, air may only be cooled to about 75° F. when the input air is 90° F. and 50 percent relative humidity, and such cooling may not be adequate to cool a particular space. The problem may get worse as temperatures increase such as to temperatures well over 100° F. as found in many locations in the southwest portion of the United States and elsewhere. As a result, the air conditioning system may need to include refrigerated air conditioning to cool the outlet air from the evaporative cooler, which results in a system that is more expensive to purchase, operate, and maintain.

Additionally, conventional evaporative coolers provide no dehumidification of the air and, in fact, often output air at 80 to 90 percent relative humidity, which may only be acceptable in very dry environments as very humid air reduces the rate of evaporation for occupants of the building (e.g., reduces comfort levels) and can cause condensation resulting in corrosion or other problems. Dehumidification is provided as a second or later stage in some evaporative coolers such as by wicking a liquid desiccant along a wall of the air flow channel or chamber, but such systems have not been widely adopted due to increased operating and maintenance costs and concerns of having the desiccant expelled with the conditioned air. In general, maintenance is a concern with evaporative coolers as the evaporation process can result in mineral deposits on the cooling pads and other surfaces of the cooler that need to be cleaned or replaced to maintain the efficiency of the system, and the water supply line needs to be protected against freezing during the off season such as by draining the system. Due to these and other concerns, evaporative cooling is unlikely to be widely used to provide an energy efficient, air conditioning alternative for commercial and residential applications until significant improvements are made to reduce maintenance concerns while improving achievable cooling (e.g., providing adequately cooled output air for direct use in a building).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

This is achieved, in part, by providing a mass/heat transfer assembly for use in indirect evaporative coolers or heat exchangers. The assembly is formed of alternating stacks each including a first (or upper) layer or sheet of membrane material, a separation wall, and a second (or lower) layer or sheet of membrane material. The membrane or membrane material for each layer is permeable to water molecules in the vapor state while the separation wall is impermeable to water but allows heat transfer (e.g., is a thin layer and/or is made of materials that conduct heat). In a first one of adjacent pairs of stacks, coolant such as water flows between the first membrane layer and the separation wall and liquid desiccant flows between the separation wall and the second membrane layer while in the second or next one of the adjacent pairs of stacks the flow order is reversed. This ordering is repeated throughout the mass/heat transfer assembly to form alternating supply and exhaust air flow channels or chambers. Supply air (or air to be conditioned) is directed through a channel between a first pair of stacks while a portion of the pre-cooled exhaust air (e.g., a fraction of the supply air that is cooled by flowing through the stacks) is directed through a chamber between a second or next pair of stacks (e.g., typically in a counterflow arrangement relative to the flow of the incoming supply air). Liquid desiccant is provided proximate to the supply inlet airflow while coolant such as water is provided proximate to the exhaust airflow (i.e., a fraction of supply outlet airflow directed to be exhausted) with the air only being separated from these flowing liquids by the water permeable membrane. The supply air inlet airflow, supply outlet airflow, exhaust airflow, liquid desiccant flow, and coolant flow are plumbed such as via one or more manifold assemblies to the mass/heat transfer assembly, which can be provided in a housing as a single unit (e.g., an indirect evaporative cooler).

In a typical embodiment, dehumidification and evaporative cooling are accomplished by separation of the air to be processed and the liquid and/or gas substances (e.g., liquid desiccant, water, desiccated air, and the like) by a membrane. The membrane is formed of one or more substances or materials to be permeable to water molecules in the vapor state. The permeation of the water molecules through the membrane is a driving force behind (or enables) dehumidification (or dehumidification in some implementations) and evaporative cooling of one or more process air streams. As described above, multiple air streams can be arranged to flow through chambers in the mass/heat transfer assembly such that a secondary (purge) air stream, such as the exhaust airflow of pre-cooled supply air, is humidified and absorbs enthalpy from a primary (process) air stream, such as the supply inlet airflow that can then be directed to a building as supply outlet airflow (e.g., make up air for a residential or commercial building or the like). The process air stream is sensibly cooled and is, in some embodiments, simultaneously dehumidified by providing a liquid desiccant flow contained by membranes defining the sidewalls of the supply inlet airflow channel or chamber.

The membrane is also used in some embodiments to define sidewalls of the exhaust (e.g., counter) airflow channel or chamber such that the membrane controls or separates coolant liquid from the exhaust air stream. Wicking materials/surfaces or other devices may be used to contain or control water flow (e.g., direct-contact wicking surfaces could be used in combination with the use of the liquid desiccant containment by a membrane), but membrane liquid control facilitates fabrication of the stacks or manifold structure useful for heat and mass exchanger/assembly configurations described herein that provide cooling, dehumidification, and/or humidification. In such configurations, the air streams can be arranged in counter-flow, counter-flow with pre-cooled exhaust air, cross-flow, parallel flow, and impinging flow to perform desired simultaneous heat and mass transfer in the evaporative cooling units.

By way of example, but not limitation, an embodiment includes an indirect evaporative cooler for cooling a stream of inlet supply air from a first temperature to a second, lower temperature using a stream of liquid coolant and a stream of exhaust or purge air. The cooler includes a first flow channel through which the stream of inlet supply air flows and a second flow channel adjacent the first flow channel through which the stream of exhaust air, at a lower temperature than the inlet or first temperature of the supply air, flows. The second flow channel is formed or defined in part by a sheet of a membrane or membrane material that is permeable to water vapor but that otherwise contains the liquid coolant. In this manner, the coolant flows on a side of the membrane (and not in direct contact) with the air in the second flow channel but mass is transferred as a vapor through the membrane to the exhaust air when or in response to heat being transferred from the inlet supply air to the liquid coolant. In some cases or configurations, as will become clear, the supply air stream (or inlet supply air) is cooled and dehumidified in this first stage. A second stage may be provided to sensibly cool the air stream to a very cool temperature, which could be below the dewpoint of the original supply inlet air as it was dehumidified initially or in the first state to allow this.

A separation wall that is spaced apart from the sheet of membrane is used to define a flow channel for the liquid coolant, with the wall being formed from a material (such as plastic) that is impermeable to the liquid coolant but that conducts or allows the heat to be transferred from the inlet air supply to the coolant. A second sheet of membrane may be spaced apart from the opposite side of this separation wall to define a flow channel for a liquid desiccant, and during operation, water vapor is transferred from the stream of inlet supply air through the membrane to the liquid desiccant, which results in the inlet supply air being concurrently cooled and dehumidified. The membrane is effective for resisting or even fully blocking flow of the liquid coolant and the liquid desiccant while allowing flow of water vapor, and in some embodiments, the coolant is water and the desiccant is a halide salt solution (e.g., a weak desiccant such as CaCl or the like). The exhaust air in some cases is a redirected portion of the stream of inlet supply air after it has been cooled to the second, lower temperature (e.g., as it is exiting the first flow channel), and the exhaust air may flow in a direction through the second flow channel that is cross, counter, or a combination of these relative to the supply air flowing in the first flow channel.

In another exemplary embodiment, a method is provided for conditioning a process or return air for a residential or commercial building. The method includes first directing the process air through a first flow channel and second directing a stream or volume of liquid desiccant adjacent one or more walls defining the first flow channel, the liquid desiccant is separated from the process air by a membrane (e.g., the membrane provides the walls) that contains the liquid desiccant and also allows water vapor from the process air to flow into and be absorbed by the liquid desiccant, which dehumidifies the process air. The method further includes concurrent with the first and second directing, third directing a stream of purge air through a second flow channel proximate to the first flow channel (e.g., parallel and adjacent). The purge air is at a temperature lower than all or at least a substantial portion of the process air in the first flow channel, and in some cases, the purge air is a fraction of the dehumidified process air exiting the first flow channel that is directed in a counter flow direction relative to the process air through the second flow channel. The method also includes fourth directing a stream of liquid coolant adjacent a wall of the second flow channel. The liquid coolant is also separated from the air by a membrane that is permeable to vapor from the coolant such that mass is transferred from the coolant to the purge air. The method provides for concurrent (or single stage) dehumidification and cooling of the process air.

According to another aspect, a mass and heat transfer assembly is provided for use in an indirect evaporative cooler or exchanger device. The assembly includes a first stack including an upper membrane, a lower membrane, and a separation wall between the upper and lower membranes. The upper and lower membranes are permeable to water in vapor form and the separation wall is substantially impermeable to liquid and vapor. Second and third stacks are provided that also each includes an upper membrane, a lower membrane, and a separation wall positioned therebetween. In the assembly, the first stack and second stacks are spaced apart (such as less than about 0.25 to 0.5 inches apart) to define a flow channel for receiving a first stream of air (e.g., air to be conditioned) and the second and third stacks are spaced apart to define a flow channel for a second stream of air (e.g., purge or exhaust air directed in cross or counter flow relative to the first stream of air). In some configurations and/or operating modes, the device does only evaporative cooling and no dehumidification. Such that the membranes are only used on the purge side and the other side of the wall is left bare for the supply air to exchange heat.

The first, second, and third stacks may be considered a set of stacks, and the assembly includes a plurality of such sets of stacks to define a plurality of air flow channels spaced apart by the stacks or layers of membranes and separation walls. A divider or separator may be provided in the flow channels to maintain spacing of the membranes while allowing flow of the air streams in the channels. The assembly may further include in the first stack a liquid coolant flowing between the upper membrane and the separation wall and a liquid desiccant flowing between the separation wall and the lower membrane. In the second stack, a liquid desiccant flows between the upper membrane and the separation wall while a liquid coolant flows between the separation wall and the lower membrane. In the third stack, liquid desiccant flows between the upper membrane and the separation wall while liquid coolant flows between the separation wall and the lower membrane. The liquid coolant may be water and during operation water vapor may be transferred from the coolant through the membrane to the second stream of air. The liquid desiccant may be a salt solution (such as weak desiccant such as CaCl or the like) and during operation or use of the assembly water vapor may be transferred from the first stream of air through the membrane to the liquid desiccant, whereby the first stream of air is simultaneously dehumidified and cooled to a lower temperature.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

Figure 1:
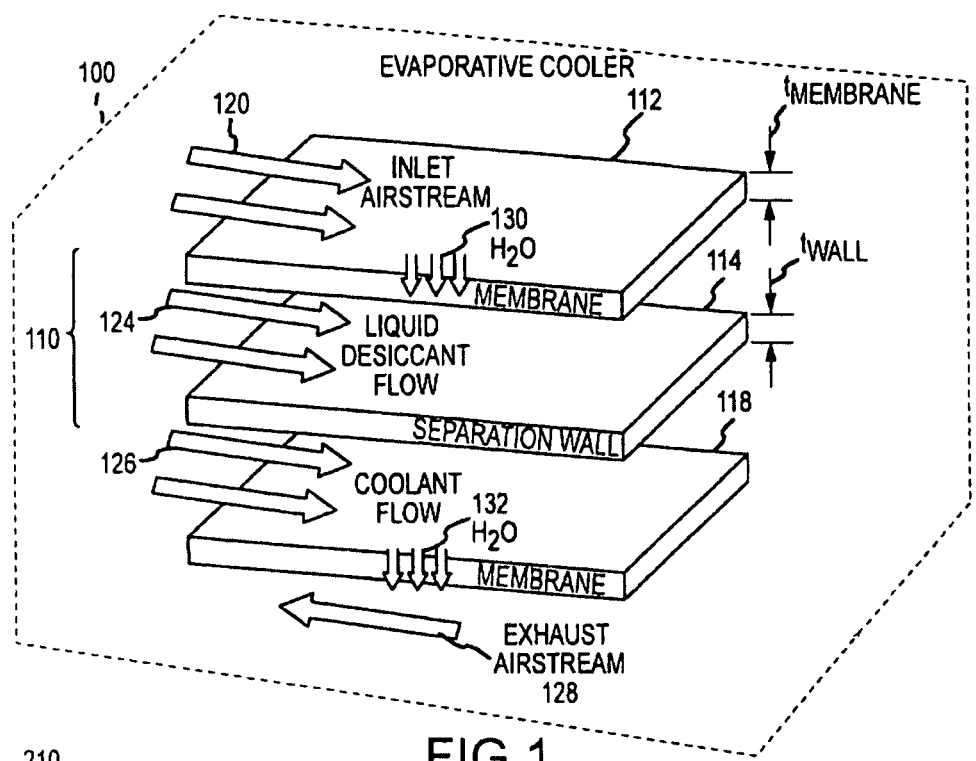
FIG. 1 illustrates in schematic form an evaporative cooler or heat exchanger including an exemplary representative of a permeable membrane stack or assembly for use in providing indirect evaporative cooling concurrently with dehumidification in an integral unit or single stage.

The following provides a description of exemplary indirect evaporative coolers with dehumidification and mass/heat transfer assemblies for such coolers that provide inlet air stream chambers with sidewalls defined by permeable membrane sheets containing liquid desiccant. The assemblies also include outlet or exhaust air stream chambers (such as in counterflow to the inlet air streams) with sidewalls defined by permeable membrane sheets containing coolant such as water. In embodiments described below, the membrane is "permeable" in the sense that moisture in the form of a vapor (e.g., water in the vapor state) generally can permeate readily through the membrane such as from an inlet supply air and from liquid coolant via evaporation. However, the membrane generally contains or blocks moisture in the form of a liquid from flowing through as it is instead directed to flow within the channel or chamber. In some cases, water in the liquid state is contained by the membrane at pressures less than about 20 psi and more typically less than about 5 psi. The coolant and the liquid desiccant in some embodiments is maintained at pressures below about 2 psi, and the permeable membrane contains moisture such as water in the liquid state while water vapor permeates the membrane.

As will become clear from the following description, use of the assemblies such as for evaporative coolers or mass/heat exchangers provides a number of benefits. The inlet or process air stream can be cooled and dehumidified simultaneously or in a single chamber/stage, and this combined action reduces system size and cost as well as the number of required components and equipment (e.g., do not require a multi-stage unit or device to cool and then to dehumidify and/or further cool with refrigerant or the like). The combination of liquid desiccant dehumidification with indirect evaporative cooling provides very high energy transfer rates due to evaporation and absorption. The design creates a liquid desiccant system that does not require separate equipment for liquid desiccant cooling (e.g., a separate cooling tower or chiller). The stacked arrangements or multi-layered mass/heat transfer assemblies (or manifolded flow chambers/channels) enable ultra-low flow liquid desiccant designs. This is due in part to the enhanced geometry of the assembly and its ability to decrease the liquid desiccant's temperature to a lower temperature than achievable with traditional cooling tower technologies. Hence, in the cooler, there are higher concentration gradients of liquid desiccant (e.g., more than 20 percentage points of lithium chloride (LiCl) and similar gradients for other desiccants), which provides the following advantages: (a) a higher thermal coefficient of performance (COP) to regenerate the desiccant (i.e., to remove water from the desiccant) for reuse in the cooler; (b) less desiccant storage requirements due to better utilization; and (c) ability to use desiccants that are less expensive than LiCl such as calcium chloride (CaCl), which may not be used in conventional systems because their absorption properties are not as favorable as LiCl but lower temperature operation provided by the cooler embodiments described herein makes the properties of this and other "weaker" desiccants more acceptable or favorable.

The use of membranes as chamber sidewalls facilitates fabrication of counter-flow and counter-flow with pre-cooled exhaust air embodiments. Liquid desiccant containment with water molecule-permeable membranes eliminates liquid desiccant "carry over" in which small droplets of desiccant are passed into the air stream as is a concern with direct contact arrangements. The embodiments described herein also provide considerable reduction or even elimination of deposited solids during the process of water evaporation or adsorption (and liquid flow rates can be maintained at levels that are high enough to further control potential deposits) whereas fouling leads to increased maintenance and operating costs with prior evaporative coolers.

FIG. 1 illustrates in a schematic an evaporative cooler (or mass/heat exchanger) 100 that is useful for providing concurrent or simultaneous dehumidifying and cooling of a process or inlet air stream 120 (e.g., outdoor or process air to be cooled and conditioned prior to being fed into a building ventilation system). The cooler 100 is shown in simplified form with a housing shown in dashed lines, without inlet and outlet ducts, plumbing, and/or manifolds. Also, the cooler 100 is shown with a single mass/heat transfer stack 110 whereas in a typical cooler 100 there would be numerous stacks 110 provided by repeating the configuration shown (e.g. by alternating the liquid passed through the chamber defined by the membrane and wall) to provide an assembly with a plurality of air and liquid flow channels or chambers to provide the desired mass and heat transfer functions described for the stack 110.

As shown, an inlet air stream 120 is directed in a chamber or channel defined in part by a sheet or layer of a membrane 112. Liquid desiccant 124 flows in an adjacent chamber or channel on the other side of the membrane 112. The liquid desiccant 124 is contained by the membrane 112, which is permeable to water molecules in a liquid or vapor state but generally not to the components of the liquid desiccant 124. The chamber for the desiccant flow 124 is also defined by a sheet or layer of material that is impermeable to fluid flow (i.e., a separation wall) 114 so as to contain the liquid desiccant 124 in the chamber or flow path. The chamber for stream 120 is also defined by an opposing membrane (not shown) that is used to contain another flow of liquid desiccant. In this manner, heat is passed or removed from the inlet air stream 120 and transferred to the liquid desiccant flow 124 (and the desiccant behind the opposite sidewall/membrane (not shown)). Concurrently, the inlet air stream 120 is dehumidified as water 130 is removed by passing through the permeable membrane 112 into liquid desiccant 124.

The liquid (or gas) desiccant 124 may take many forms to act to dehumidify and cool the air stream 120 as it passes over the membrane 112. Desiccant 124 is generally any hygroscopic liquid used to remove or absorb water and water vapor from an air stream such as stream 120. Preferably, the desiccant 124 chosen would be a regenerable desiccant (e.g., a desiccant that can have the absorbed water separated and/or removed) such as a glycol (diethylene, triethylene, tetraethylene, or the like), a salt concentrate or ionic salt solution such as LiCl, CaCl, or the like, or other desiccants. The membrane 112 may be formed of any material that functions to contain liquid desiccant 124 and, typically, coolant 126 (e.g., water or the like) while also being permeable to molecules of water in liquid or vapor state. For example, polymer membranes may be used that have pores that are about the size or just bigger than a water molecule and, in some cases, that are also adapted to provide water molecules with high mobility through the membrane 112. In one particular embodiment, the membrane 112 is formed from a membrane material as described in detail U.S. Pat. No. 6,413,298 to Wnek, which is incorporated in its entirety herein by reference. The membrane material may also be obtained from a number distributors or manufacturers such as, but not limited to, Dias-Analytic Corporation, Odessa, Fla., U.S.A. The membranes 112, 118 and separation wall 114 preferably also are formed from materials that are resistive to the corrosive effects of the desiccant, and in this regard, may be fabricated from a polymer or plastic with the wall in some cases being formed of a corrosion resistant metal or alloy, which provides a higher thermal conductivity compared with a plastic.

The embodiment 100 shown is configured for counter-flow of the pre-cooled exhaust air stream 128 (relative to the inlet air stream 120). Other embodiments may use cross (at about a 90 degree flow path) or quasi-counter flow (e.g., not directly counter or opposite in direction but transverse such as a greater than 90 degree angle flow path relative to air stream 120). The exhaust air stream 128 flows in a channel or chamber defined by a sheet or layer of membrane (e.g., second or lower membrane) 118 and an upper membrane of another stack (not shown). The separation wall 114 and membrane 118 define a flow chamber or channel for coolant flow 126, which is typically a flow of water or the like. Heat is transferred from the liquid desiccant 124 to the coolant 126 through the separation wall, and the coolant 126 is cooled as heat and mass (e.g., water or other moisture 132) is transferred to the exhaust stream 128 via membrane 118. Heat transfer is not shown but generally is flowing through the membrane 112 to the liquid desiccant 124, through the separation wall 114 from the liquid desiccant 124 to the coolant 126, and through the membrane 118 from the coolant 126 to the exhaust air stream 128. The membranes 112, 118 are relatively thin with a thickness, $t_{mem}$, that typically is less than 0.25 inches and more typically less than about 0.1 inches such as 100 to 130 microns or the like. The membrane 112, 118 may have a tendency to expand outward if unrestrained, and, in some embodiments, such as that shown in FIG. 3, a divider or "flow field" support is provided in the inlet air stream 120 and exhaust air stream 128 (i.e., in the airflow chambers) to maintain the separation of the adjacent membranes (e.g., a plastic or metallic mesh with holes or openings for air flow and a zig-zag, S or W-shaped, or other cross section (or side view) that provides many relatively small contact points with the membranes 112, 118). The separation wall 114 also typically is relatively thin to facilitate heat transfer between the desiccant 124 and coolant 126 such as with a thickness, $t_{wall}$, of less than 0.125 inches or the like. The flow chambers for the air, desiccant, and coolant are also generally relatively thin with some applications using chambers less than 1 inch thick (or in depth) while others use chambers less than about 0.5 inches such as about 0.25 inches or less.

Figure 2:
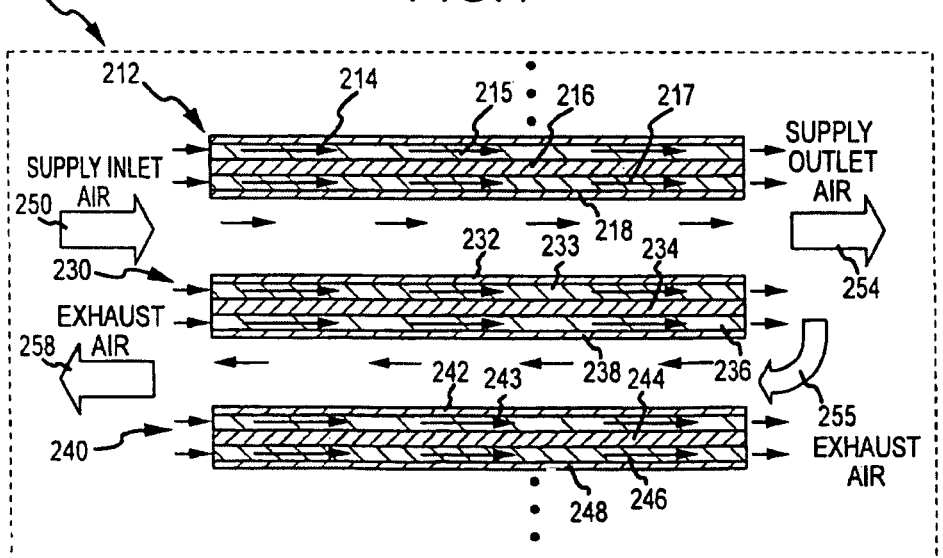
FIG. 2 illustrates another an exemplary representation of an evaporative cooler showing an assembly of membrane/wall/membrane stacks used in combination to direct the supply and exhaust airflows relative to membrane-contained liquid desiccant and coolant (e.g., cooling water) to achieve cooling and dehumidification.

FIG. 2 illustrates an indirect evaporative cooler 210 utilizing the membrane/separation wall/membrane stack or assembly configuration to provide a mass/heat transfer exchanger device in which dehumidification and cooling occur within a single stage and, therefore, an integral or unitary device. In some embodiments (not shown), there is no desiccant side membrane or desiccant flow. Thus, these embodiments are useful for providing an indirect evaporative cooler in which the membrane contains liquid coolant but not liquid desiccant and the membrane typically would not be provided on the supply air side (or in these channels) to provide better heat transfer surfaces with the separation wall. As shown in FIG. 2, the cooler 210 includes a mass/heat transfer assembly formed from stacks or devices 212, 230, 240 and such an assembly of stack would typically be repeated to provide a plurality of inlet and exhaust air, coolant, and desiccant flow channels or chambers in the cooler 210. As shown, each set of stacks (or layered assemblies or devices) 212, 230, 240 is formed similarly to include a membrane, a separation wall, and a membrane, with the membrane being permeable to water on the molecular level to allow mass and heat transfer and the wall being impermeable (or nearly so) to only allow heat transfer and not mass transfer.

Specifically, the stack 212 includes an upper membrane layer 214, a separation wall 216, and a lower membrane layer 218. Dividers or spacers (not shown) would typically be provided to space these layers apart to define flow channels for coolant 215 and for liquid desiccant 217. For example, the separators may be configured to also provide a connection to a supply line for coolant and for regenerated desiccant, provide a manifold(s) to direct flow through the various stacks 212, 230, 240, and provide a connection to a return line for the coolant and diluted desiccant. The stacks 230 and 240 likewise include an upper membrane layer 232, 242, a separation wall 234, 244, and a lower membrane layer 238, 248. The stack 240 has coolant (such as water) 243 directed in the chamber between the upper membrane 242 and wall 244 and desiccant 246 flowing between the wall 244 and lower membrane layer 248 similar to stack 212. In contrast, the stack 230 has liquid desiccant 233 directed to flow in the chamber defined by the upper membrane layer 232 and wall 234 and has coolant 236 directed to flow in the chamber or channel defined by the wall 234 and lower membrane layer 238.

The cooler 210 includes ducting and the like (not shown) to direct supply inlet air 250 through the channel or flow path between the stack 212 and the stack 230. The arrangement of the stacks 212, 230, 240 and contained fluids results in the supply inlet air 250 being passed over the surfaces of the membranes 218, 232 that are containing liquid desiccant 217, 233. As a result, supply outlet air 254 is output that is dehumidified as moisture in the air 250 is absorbed by the desiccant 217, 233 via permeable membrane 218, 232, and the air 254 is also cooled by the interaction with desiccant 217, 233. The cooling effect in the cooler 210 is in part effected by a fraction of supply outlet air 254 being redirected in the cooler 210 by ducting/manifolds (not shown) to flow as pre-cooled exhaust air 255 through the channel or flow path between stacks 230, 240 to be output as warmer and moister air 258. Heat passes from desiccant 233 through wall 236 to coolant 236 (with similar heat transfer occurring in stacks 212, 240), and the coolant 236 is able to transfer heat and mass (e.g., water molecules) via membrane 238 to the incoming exhaust air 255. As discussed above, the stack pattern or set provided by 212, 230, 240 would typically be repeated within the cooler 210 to create a mass/heat transfer assembly with numerous, parallel flow channels for air, coolant, and desiccant.

Figure 3:
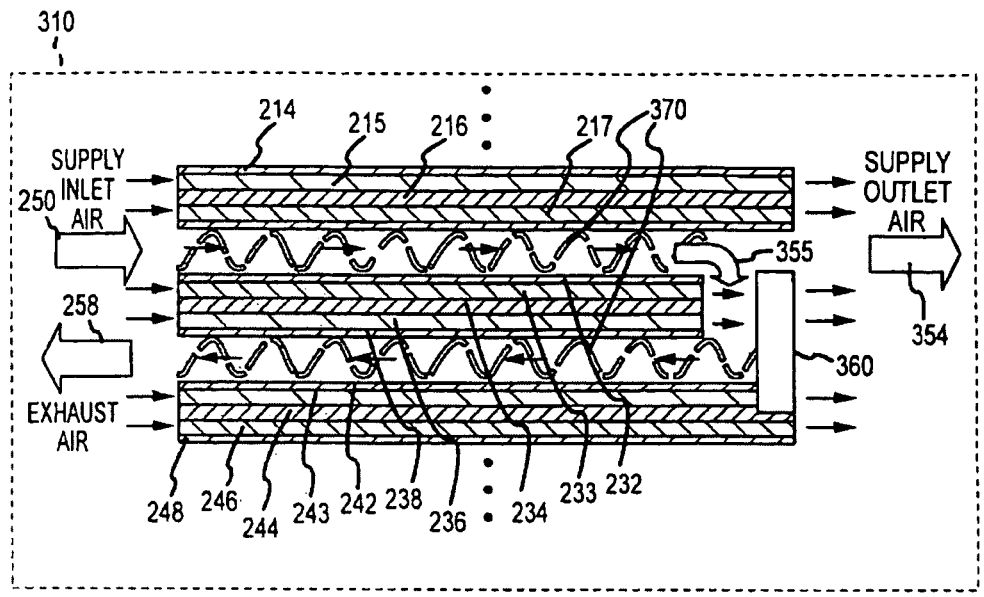
FIG. 3 illustrates an evaporative cooler similar to that shown in FIG. 2 but being configured with integral counterflow passages for exhaust/cooled air.

The cooler 210 is shown as a counter flow exchanger, but other flow patterns may be used to practice the desiccant-based dehumidification and cooling described herein. For example, cross flow patterns may readily be established as well as quasi (or not fully opposite) counter flow patterns. These patterns may be achieved by altering the manifolding and/or ducting/plumbing of the cooler as well as the dividers provided between the stacks. Additionally, the counter flow passages may be provided integral to the stack assembly rather than externally as is the case in the cooler 210. For example, the cooler 310 has a similar stack arrangement as shown in the cooler 210 of FIG. 2 except that it includes a counterflow baffle or dividing wall 360 on the end of the flow channels for inlet air 250 and exhaust air 258. The counterflow divider 360 allows a majority of the cooled air to exit the stacks as supply outlet air 354 (e.g., more than about 50 percent and more typically 60 to 90 percent or more of the air flow 250). A smaller portion (e.g., a volume equal to the make up outdoor air or the like) is directed by divider 360 to flow between stacks 230, 240 as pre-cooled exhaust air 355. FIG. 3 also illustrates the use of a divider or flow field baffle 370 that functions to maintain a separation of membranes in the stacks 212, 230, 240 (or at about their original thickness rather than puffed out or expanded as may occur with some permeable membranes). The dividers 370 may take many forms such as a mesh with a wavy pattern (e.g., an S or W-shaped side or cross sectional view), with the mesh selected to provide as little resistance to air flow as practical while still providing adequate strength. Also, it is desirable to limit the number of contact points or areas with the membranes as these can block moisture transfer from the air 250 and to the air 355.

Figure 4:
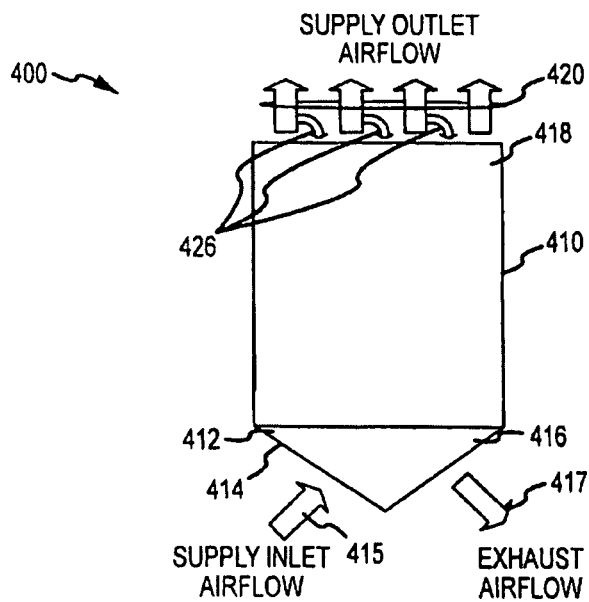
FIG. 4 is a top view of an exemplary heat exchanger illustrating air flows through a plurality of channels or chambers provided by membrane-based assemblies such as those shown in FIGS. 1-3 or other embodiments shown or described herein.

FIG. 4 illustrates an indirect evaporative cooler 400 of one embodiment. A housing 410 is provided for supporting a mass/heat transfer assembly such as one formed with the stack sets shown in FIGS. 1-3. As shown, the housing 410 includes a first end 412 with an inlet 414 for supply inlet airflow 415 and an outlet 416 for exhaust airflow 417. The cooler 4100 further includes a second end 418 opposite the first end 412 that provides an outlet or vent for directing supply outlet airflow 420 to an end-use device or system (e.g., an inlet or supply for return air to a building). The second end 418 is also configured to redirect a portion 426 of the cooled (and, in some operating modes, dehumidified) air 426 for use in counter flow cooling of the supply inlet airflow 415. A prototype of the cooler 400 was fabricated with a stack assembly as shown in FIG. 2 with 32 desiccant channels. The prototype was tested with 10 liters per minute (LPM) flow (or about 0.3 LPM per desiccant channel). Coolant was provided as water at a water flow rate of about 1.25 to 2.00 times the evaporation rate. The evaporation rate for this prototype was about 1.33 gallons/ton-hr or about 5 liters/ton-hr, which provides a water or coolant flow rate of about 6-10 liters/ton-hr of cooling. Of course, these are exemplary and not limiting flow rates, and it is expected that the flow rates of liquid desiccant and coolant will depend on numerous factors and will be matched to a particular channel design and cooling need as well as other considerations.

Figure 5A:
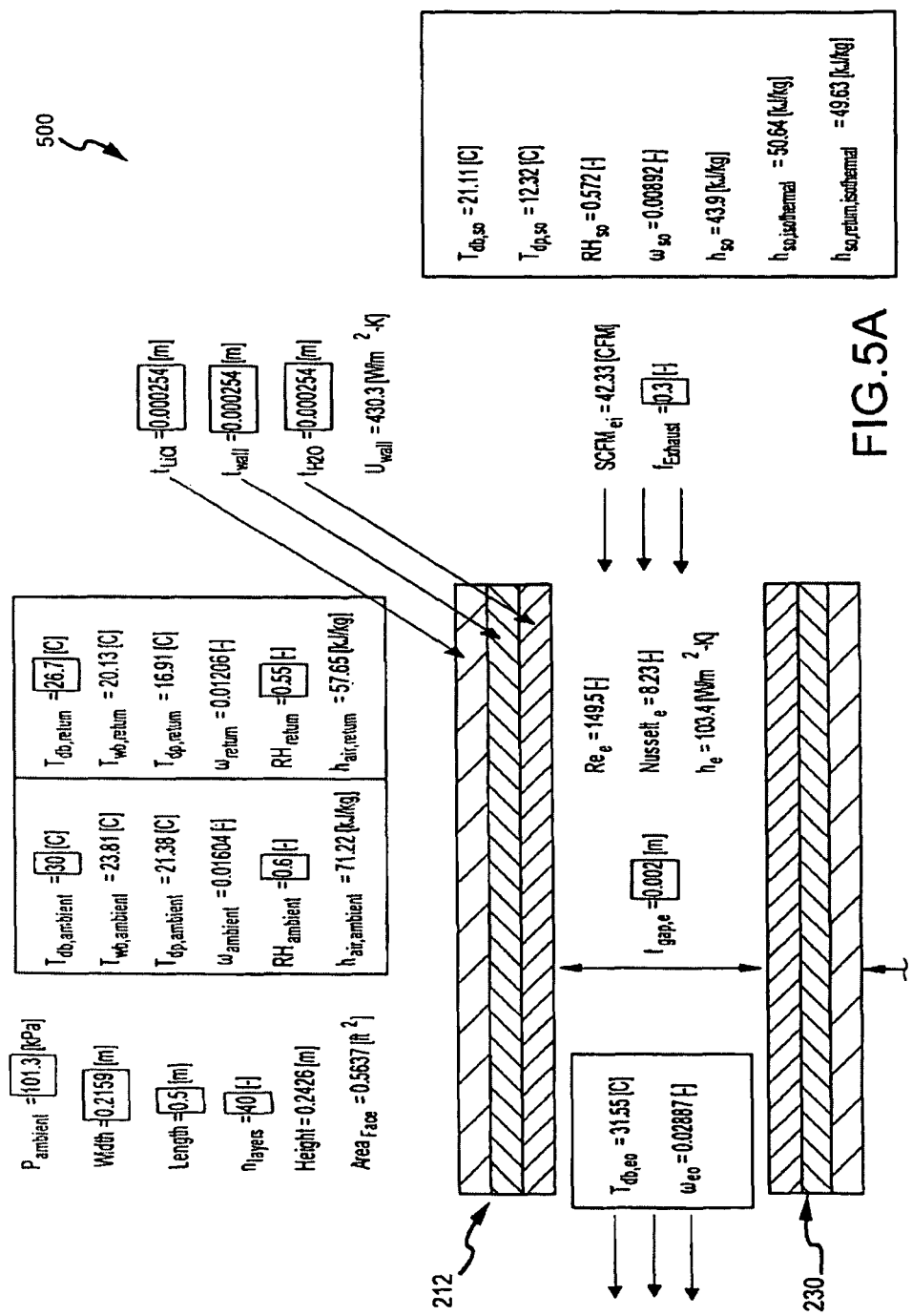
FIG. 5 illustrates an exemplary modeling of an evaporative cooler or counterflow heat/mass exchanger such as one with the stack assembly shown in FIG. 2 and flow arrangement shown in FIG. 4.
Figure 5B:
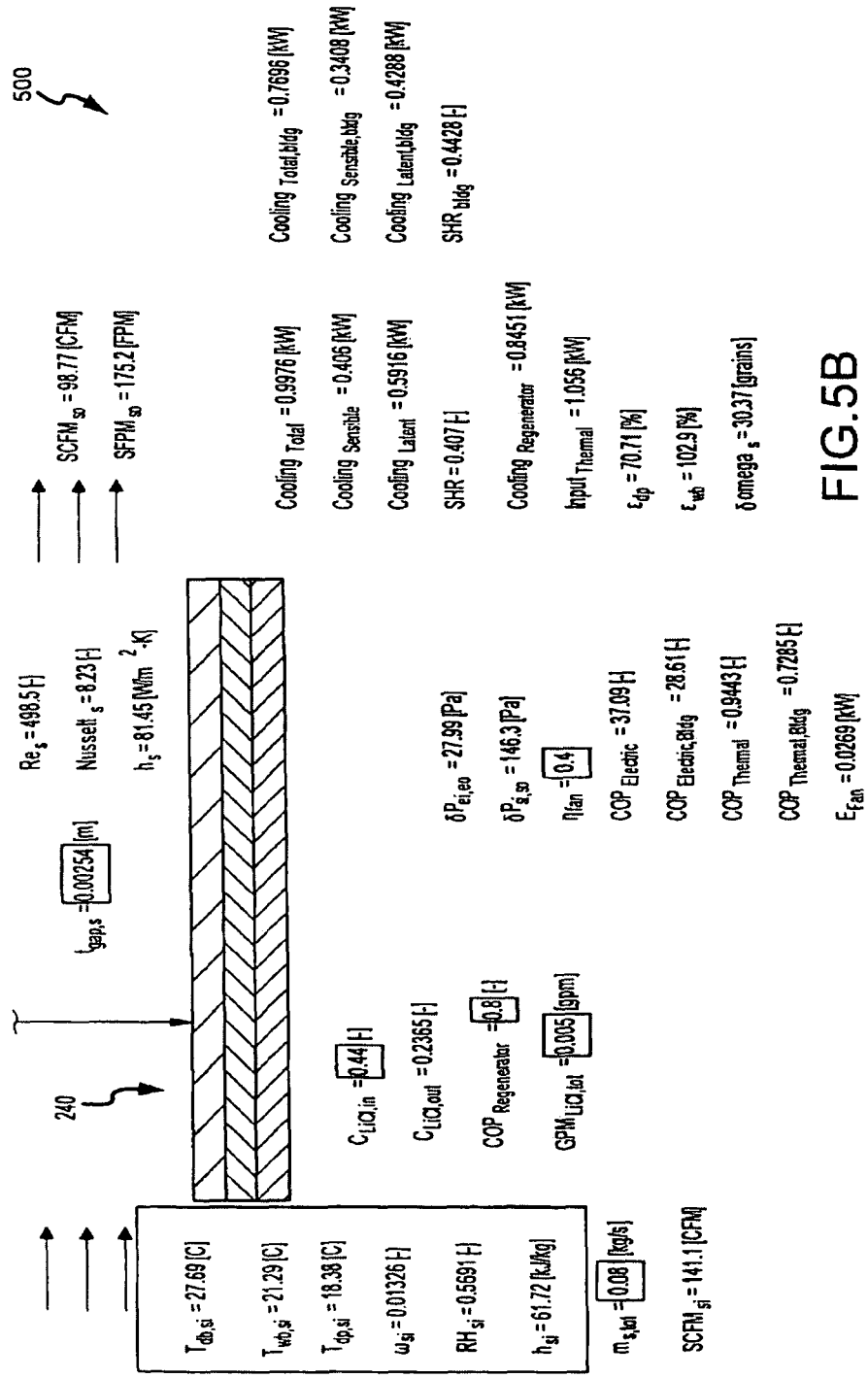

An indirect evaporative cooler such as the cooler 400 using stack sets as shown in FIG. 2 may be modeled to determine the effectiveness of the use of a permeable membrane to contain coolant and liquid desiccant. FIG. 5 provides a diagram 500 of such modeling showing use of stacks 212, 230, and 240 as discussed with reference to FIG. 2 to cool inlet or process air and to also dehumidify this air in the same stage or process. The inputs to the model 500 are shown, and results for a typical inlet air condition are provided, with results and modeling being performed in this case with Engineering Equation Solver (EES). The numeric values shown in boxes or with squares around them are input values (or assumed typical operating conditions), and the values outside or without boxes are outputs or results of the modeling. The modeling results shown in the diagram 500 are believed to be self-explanatory to those skilled in the heating, ventilation, and air conditioning (HVAC) arts and do not require detailed explanation to understand the achieved effectiveness of the embodiments using membrane containment in indirect evaporative coolers; however, the following provides a graphical description of some of the results in the model 500.

Figure 6:
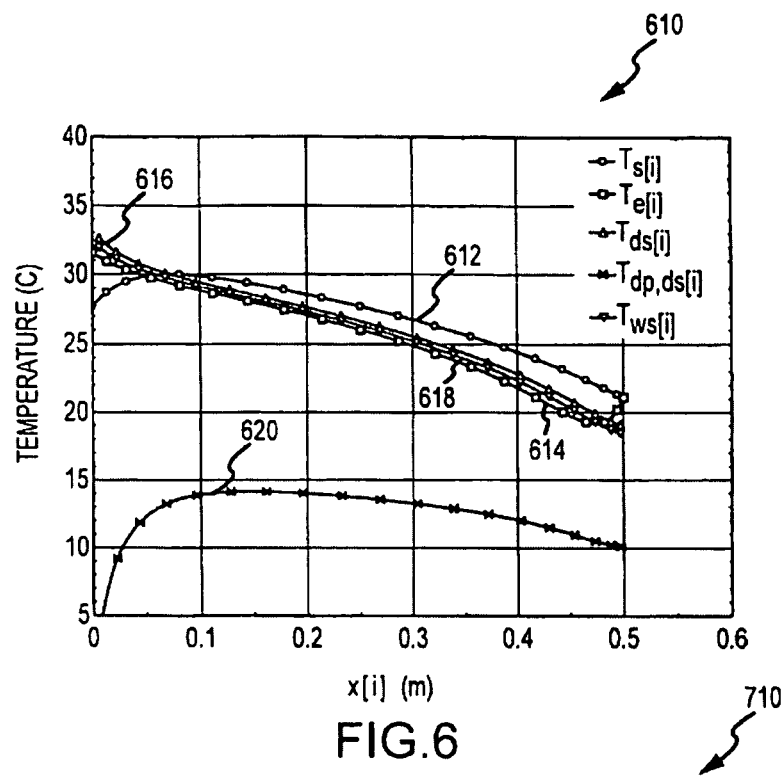
FIG. 6 is a graph of air flow and surface temperatures along the length of the exchanger modeled as shown in FIG. 5.

FIG. 6 illustrates a graph or diagram 610 showing the temperatures of the air flows in the channels between the stacks (e.g., in an evaporative cooler using such mass/heat transfer assembly described herein). The graph 610 also shows surface temperatures along the length of the counterflow mass/heat exchanger (e.g., exchanger 400 with stack arrangements as shown in FIG. 2). Specifically, the graph 610 shows the temperature of supply air with line 612, the temperature of exhaust/purge air with line 614, the temperature of the desiccant side membrane surface (e.g., at the interface of the membrane and the supply air) with line 616, the dewpoint temperature of the desiccant side membrane surface (e.g., at the interface of the membrane and the supply air) with line 620, and the temperature of the water side membrane surface (e.g., at the interface of the membrane and the exhaust/purge air) with line 618.

Figure 7:
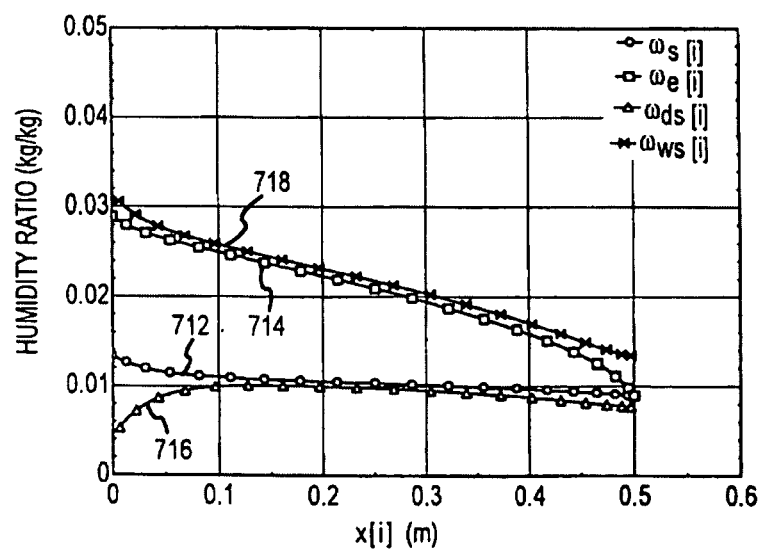
FIG. 7 is a graph of humidity ratios of the air along the length of the exchanger modeled as shown in FIG. 5.
Figure 8:
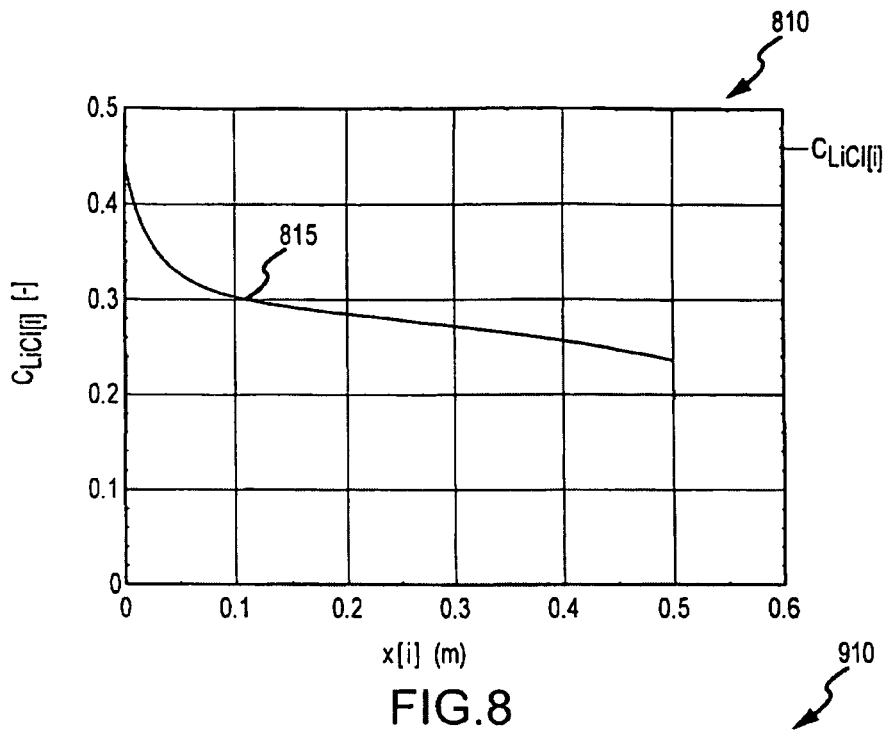
FIG. 8 is a graph showing concentration of liquid desiccant flowing through the modeled heat exchanger of FIG. 5.

FIG. 7 is a graph or diagram 710 showing the humidity ratios of the air along the length of the counterflow heat/mass exchanger. Specifically, the graph 710 shows the bulk humidity ratio of the supply air with line 712, the bulk humidity ratio of exhaust/purge air with line 714, the humidity ratio of the air in close proximity to the desiccant side membrane surface (e.g., at the interface of the membrane and the supply air) with line 716, and the humidity ratio of the air in close proximity to the water side membrane surface (e.g., at the interface of the membrane and the exhaust/purge air) with line 718. FIG. 8 illustrates a graph 810 showing with line 815 the concentration of desiccant (in this particular modeling the desiccant is LiCl) as it flows concurrent with the supply air flow down the length of the counterflow mass/heat exchanger. As shown with line 815, the desiccant is getting weaker as it flows through the channel between the membrane and the separation wall as it absorbs water molecules from the air, e.g., the concentration of the desiccant is dropping from about 44 percent down to about 24 percent in this particular modeling example (which results from the membrane being characterized as permeable (at a particular input rate or setting) to water molecules in the flowing air at these operating conditions).

Figure 9:
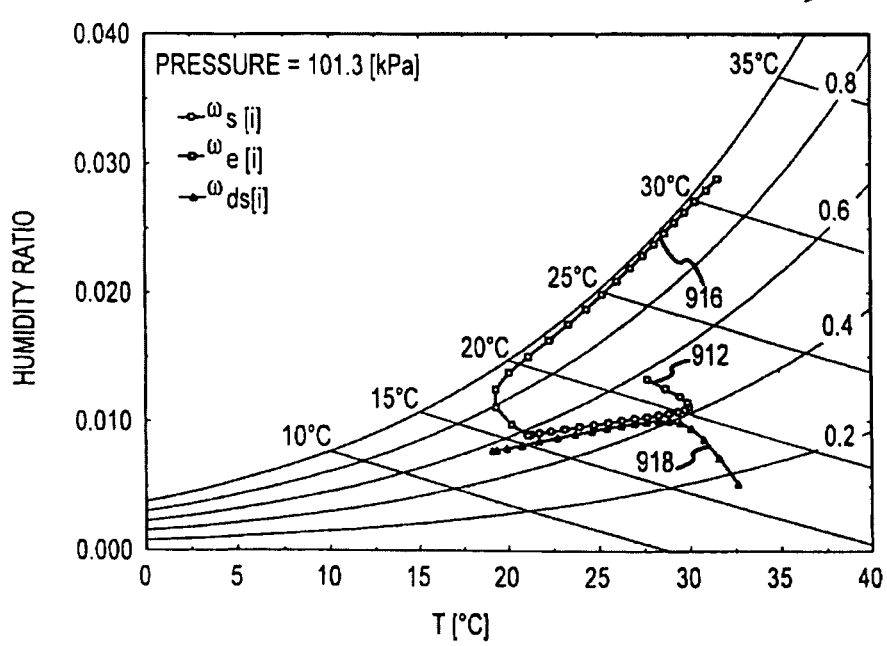
FIG. 9 is a psychrometric chart showing the cooling and dehumidifying process modeled as shown in FIG. 5.

FIG. 9 shows the process of model 500 of FIG. 5 in a psychrometric chart 910. The supply air shown with line 912 can be seen to be gradually losing humidity (in kilograms water vapor/kilograms dry air or $kg_v/kg_{da}$). The supply air 912 has its temperature initially rise slightly due to the large heat flow of vapor sorption into the desiccant. As the supply air 912 continues down the length of the exchanger (or flow channel or chamber between membrane layers or walls of adjacent stacks containing liquid desiccant), the temperature then drops to a cooler/drier condition that at the inlet. At the exit of the exchanger, the supply air 912 is split into two streams. The majority of the air is supplied to the cooled space, and the minority of the air (such as less than about 50 percent and more typically less than about 30 percent of the volume) gets funneled into the exhaust/purge side (or exhaust/counterflow channels between the membrane walls containing coolant) of the heat/mass exchanger or cooler, which is shown with the line 916. The exhaust air 916 has a low dewpoint, and, thus, it can pick up a large amount of heat evaporatively. The pre-cooled exhaust or purge air 916 picks up water vapor (and associated heat of vaporization) from the wet side channel. The air 916 exits out of the unit with a much higher enthalpy than either the supply inlet or exit shown with line 912. The diagram 910 also shows the humidity ratio and temperature of the supply air in close proximity to the desiccant side membrane surface (ds) with line 918.

The following table shows results in tabulated form for modeling of FIG. 5 for inlet and outlet air flows. As shown, a wide range of temperatures and humidity levels can be chosen and input into the model 500. In the configuration whose results are shown in the table, the equivalent wet bulb effectiveness with the desiccant flow turned off (e.g., in some operating modes it may not be required or useful to utilize the desiccant to dehumidify the air) would be 113 percent, which means the cooler is able to cool the supply air below the inlet wet bulb temperature.

TABLE

| | Inlet and outlet conditions from model runs (° F. and kg/kg) | | | | | |
|---|---|---|---|---|---|---|
| Run # | $T_{supply,in}$ | $T_{supply,out}$ | $T_{exhaust,out}$ | $\omega_{supply,in}$ | $\omega_{supply,out}$ | $\omega_{exhaust,out}$ |
| 1 | 27.7 | 21.11 | 31.55 | 0.0133 | 0.00892 | 0.0289 |
| 2 | 50.0 | 33.7 | 50.7 | 0.0319 | 0.0179 | 0.0834 |
| 3 | 50.0 | 20.7 | 41.0 | 0.0077 | 0.00406 | 0.0494 |
| 4 | 30.0 | 13.1 | 27.2 | 0.00262 | 0.00158 | 0.0226 |
| 5 | 30.0 | 18.9 | 42.55 | 0.0269 | 0.0137 | 0.0547 |
| 6 | 15.0 | 16.9 | 25.4 | 0.0105 | 0.00418 | 0.0207 |
| 7 | 15.0 | 11.9 | 20.0 | 0.00528 | 0.00203 | 0.0147 | where LiCl Inlet Concentration = 44%; flow ratio (flow exhaust/(flow exhaust + flow supply) = 0.3; supply outlet face velocity = 175 SCFM; and ambient pressure = 101.3 kPa.

The cooler 210 of FIG. 2 may be thought of as a desiccant-enhanced, indirect evaporative cooler that utilizes a membranes or layers of membrane material that is permeable to water molecules to provide desired liquid containment. A standard psychrometric chart (such as one at 14.7 psi ambient pressure and other typical parameters) may be used to view lines of equal sensible heat ratios (SHRs) originating at a typical room setpoint. For vapor compression dehumidification, a SHR of less than about 0.7 is difficult to attain without reheat (e.g., given reasonable evaporator temperatures). Also, it is psychrometrically impossible to attain a SHR of less than about 0.6 without reheat, and attempting such a SHR often leads to frozen evaporator coils that require defrost cycles. The desiccant-enhanced, indirect evaporative cooler, such as shown in FIG. 2 at 200, addresses this problem with a unique, new process (as has been described above and is presented in more detail below).

It may be useful at this point to review the process with reference to FIGS. 2 and 3. FIGS. 2 and 3 show diagrams describing the inner flow channels of the unit or assembly for use in an evaporative cooler 210, 320. The mixed return/outdoor air is shown by the arrow 250 (e.g., return air from a conditioned space along with outdoor make up air such as 400 cfm/ton supply and 175 cfm/ton outdoor air or the like). The air 250 is dehumidified by the desiccant 217, 233 through the membrane 218, 232. This lowers both the dew point and temperature of this air stream until it is output at 254 or 354. At the exit of the supply air passage (between the liquid desiccant-containing membranes), a portion of the air is fractioned off as shown with arrows 255 and 355 and sent through an adjacent passage (between the coolant-containing membranes 238, 242) which picks up moisture from the water layer 236, 243 through the membrane 238, 242. The heat of evaporation is a source of cooling that acts to remove the sensible heat and heat of absorption from the supply air stream 250. This air is then exhausted (purged) out at 254, 354.

Heat exchanger configuration shown at 400 in FIG. 4 has been built in the laboratory by the inventors and was modeled as shown in FIG. 5. Other options for flow/housing designs are shown in configuration with the cooler 1000 of FIG. 10 and the cooler 1100 of FIG. 11. The cooler 1000 is shown to have a housing 1010 with a first portion or end 1012 and a second portion or end 1020. The first portion 1012 is configured with inlet or vents for receiving supply inlet airflow 1013 as well as input exhaust airflow 1014, and the first portion 1012 also includes vents or outlets for outputting exhaust airflow 1015 from the unit 1000. The second portion 1020 is configured (e.g., with manifolds and other components to direct air flow) with outlets for supply outlet airflow 1022 with a portion 1025 being redirected back into the housing 1010 as shown at arrows 1027 to provide counterflow for a fraction of the channel provided for supply inlet airflow 1013 (with exhaust airflow 1014 provided as a cross flow in the other or initial portion of the channel) and then this air is exhausted from the housing portion 1020 at 1028. The input exhaust airflow 1014 may be return air to be exhausted or outdoor air (e.g., from the building space). This approach 1000 improves the efficiency by utilizing a smaller purge airflow 1025, 1027, and it is typically preferred to limiting purge air flow to increase or maintain desirable efficiency.

Referring again to FIG. 4, operation of the cooler 400 is expected to have the cooling process shown in the psychrometric chart 910 of FIG. 9. As shown, line 912 represents the supply air flow while line 916 represents the purge air flow stream. The desiccant side air boundary layer is represented with line 918. The chart shows graphically how the dehumidification driver for the cooler 400 is advantageously utilized to provide a more effective cooler. The cooler 400 may use even a weak desiccant such as CaCl solution to provide significant dehumidification, and this is due in part to the cold temperatures that are achieved with the configuration of the cooler 400 that allow weak desiccants to attain high dehumidification potential.

Figure 10:
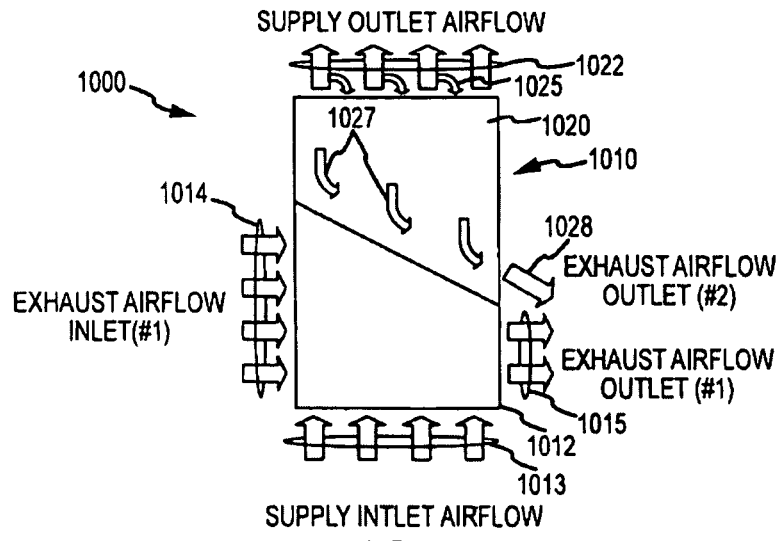
FIG. 10 is a top view of another exemplary heat exchanger illustrating air flows through a plurality of channels or chambers provided by membrane-based assemblies such as those shown in FIGS. 1-3 or other embodiments shown or described herein.
Figure 12:
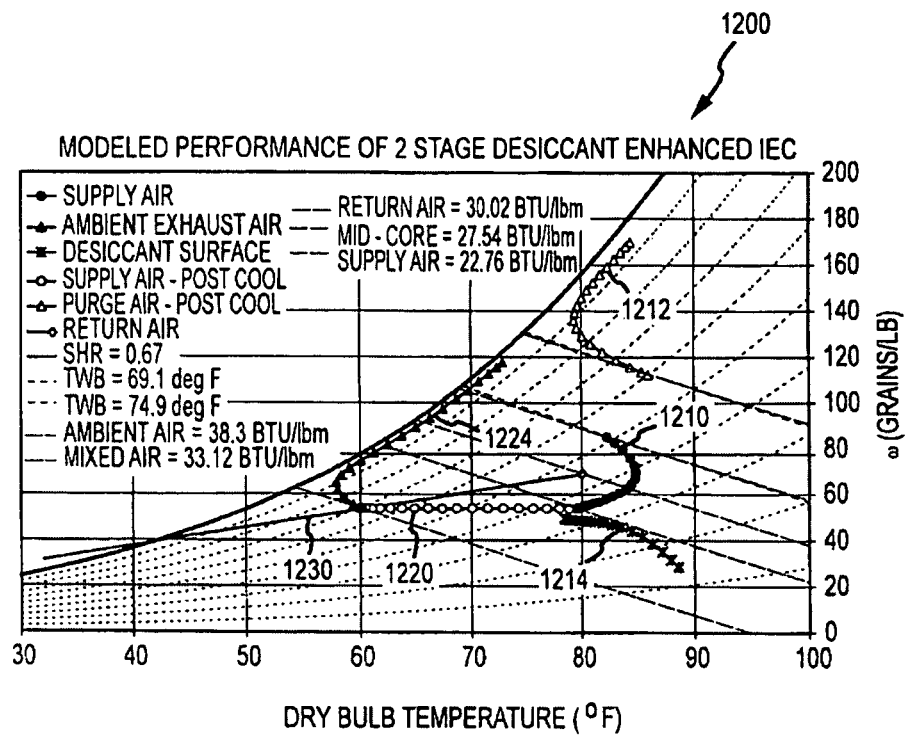
FIG. 12 is a psychrometric chart showing the cooling and dehumidifying process modeled similar to the modeling shown in FIG. 5 for the configuration of a heat exchanger shown in FIG. 10.

The configuration shown with cooler 1000 of FIG. 10 was modeled to determine the desirability of its performance, and the results are provided in psychrometric chart 1200 of FIG. 12. In the chart 1200, line 1210 represents supply air, line 1212 represents ambient exhaust air, line 1214 represents desiccant side surface temperatures, line 1220 represents the supply air post cooling, line 1224 represents the purge air post cooling, and line 1230 is the sensible heat ratio line (SHR) in which the load on the building follows. So, for example, a building will have 0.67 units of sensible heat and 0.33 units of latent heat added to the space to arrive at the return air condition, which is the middle diamond at 80° F. and about 70 grains/lb, and that point may be considered the return air condition. The first point of line 1210 is the "mixed air" condition, which is a 30/70 mixture of outdoor air and return air. The two-stage approach to cooling provided by cooler 1000 allows the process to be split into two distinct sections of dehumidification plus a post cooling stages (e.g., sensible cooling only stage in which, for example, there is no desiccant layer and dehumidification and only evaporative cooling is provided). The cooler 1000 is, of course, only one example of numerous configurations that may be implemented to provide two or more stage cooling using the membrane containment features described herein, and it shows the possibility of attaining nearly any SHR desired (e.g., in this case, a SHR of about 0.67). In the modeling to provide the chart 1200, a 1 cubic foot core (or mass/heat transfer assembly) was used with 176 SCFM, and a flow ratio of about 0.3 (e.g., 30 percent purge and 70 percent supply air). Also, the return air was at 80° F. and 40 percent relative humidity, ambient air was at 86° F. and 60 percent relative humidity, and the liquid desiccant fed into the assembly was 44 percent LiCl (but other desiccants such as solutions of salt (such as, but not limited to, halide salts) and water that are about 20 to 40 percent salt by weight may be used). The assembly was able to provide 0.5 tons of building cooling with just this 1 cubic foot at about 7 Btu/lb. As can be appreciated from this example and modeling, the use of membranes to contain desiccant and coolant (e.g., to contain liquids) enable indirect evaporative coolers to be produced that are much more compact than prior designs, that are easier to maintain (e.g., have less or no fouling issues), and that are more efficient in producing cooling (e.g., with simultaneous dehumidification and cooling to provide an evaporative cooler that can condition as well as cool process air).

Figure 11:
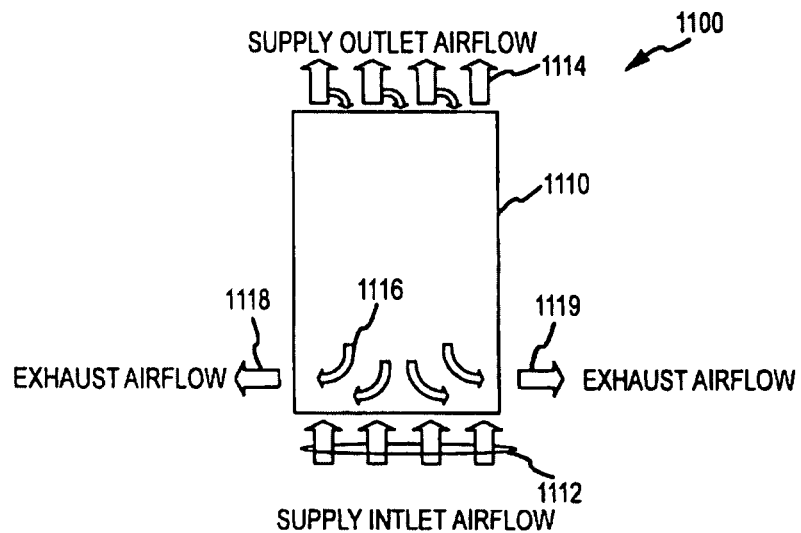
FIG. 11 is a top view of another exemplary heat exchanger similar to those shown in FIGS. 4 and 10 showing a differing unit arrangement with differing exhaust airflows.

FIG. 11 illustrates an evaporative cooler 1100 providing another counterflow arrangement in which the counterflow cooling air (or pre-cooled supply air) is directly opposite in direction but only for a selected length (such as half to 80 or 90 percent or more of the length) of the stacks or flow chambers (e.g., when full counterflow is not required or desired). As shown, the cooler 1100 includes a housing 1110 containing a plurality of stacks or sets of stacks configured as a mass/heat transfer assembly (as discussed above) with alternating flow channels for supply inlet airflow 1112 and for counterflow air (e.g., redirected supply outlet airflow 1114). The housing 1110 includes venting and/or manifolding for directing the supply inlet airflow 1112 (e.g., outdoor make up air and return air) into channels between desiccant containing membranes and to output the cooled and, often, dehumidified supply outlet airflow 1114. The cooler 1100 further includes ducting, manifolding, and the like for redirecting a fraction of the supply outlet airflow back into the housing 1110 to provide cooling counterflow air as shown at 1116 (e.g., into flow channels between coolant containing membranes). The counterflow air 1116 typically does not travel along the entire length of the housing 1110 but is, instead, discharged out a side vent at some point along a channel length (e.g., at a distance about 60 to 80 percent of the length). Such a configuration is useful to tune a cooler 1100 for particular operating environments (e.g., to provide a desired amount of cooling to the supply outlet airflow based on outside air temperatures and humidities and other operating parameters).

Figure 13:
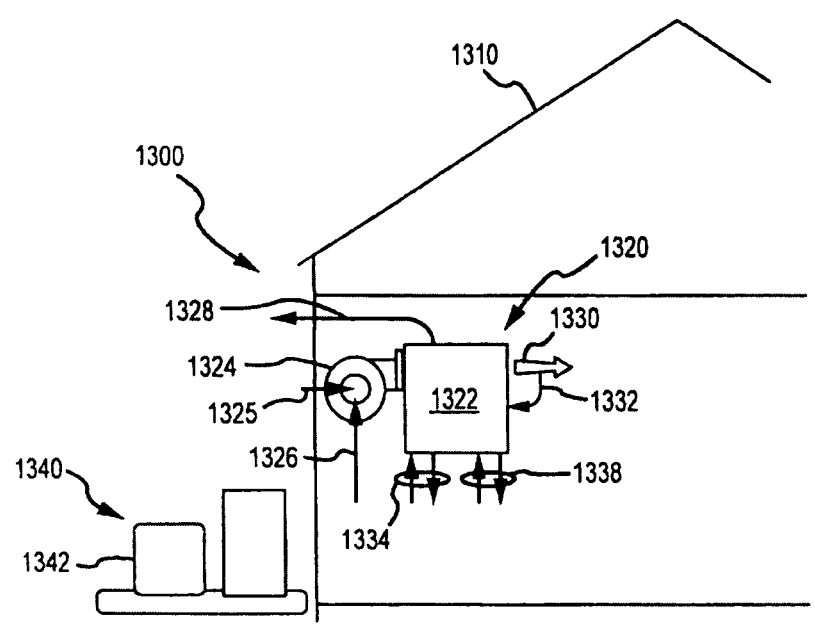
FIG. 13 illustrates a HVAC system using an indirect evaporative cooler to provide conditioned air to a building.

The stack and membrane technology described herein are readily applicable to a number of indirect evaporative cooler designs (with and without use of liquid desiccant for dehumidification) and applications. However, it may be useful to discuss the use of the technology within an air conditioning or HVAC system with the belief that those skilled in the art will readily understand that the technology is useful in many other such systems. FIG. 13 illustrates a simplified air conditioning system 1300 in which the membrane technology may be provided to provide desiccant dehumidification and evaporative cooling to condition air within a building 1310 (e.g., a residential or commercial building or other structure requiring conditioned and cooled air). As shown, the system 1300 includes a cooler 1320 with a housing 1322 that is used to house a membrane stack assembly, such as described above with reference to FIGS. 1-12. A fan or blower 13224 is provided to draw in outside or make up air 1325 and move return air 1326 from the building 1310. The fan 1324 pushes these two air streams as inlet supply air through the stacks as described above (e.g., adjacent liquid desiccant contained in membrane in embodiments providing dehumidification or adjacent separation walls in embodiments with just evaporative cooling). The cooled (and, typically, conditioned air is output at 1330 as supply to the building 1310 and a portion is returned 1332 as purge or pre-cooled exhaust air that passes on the coolant or evaporative cooling side of the stacks in housing 1322 and then out as exhaust 1328. Coolant is provided in the form of a water supply and drain 1334 to the housing (and through the stack assembly), and liquid desiccant is provided at 1338 as supply and drain. The desiccant 1338 is regenerated with a regenerator system 1340 including, in this example, a desiccant boiler 1342.

The desiccant enhanced indirect evaporative cooler (DE-IDEC) 1320 is the portion of the system 1300 that takes strong desiccant and water to provide cooling to building 1310. The system 1300 provides both sensible and latent cooling to building 1310 on demand and in proportion to the demand, e.g., the system 1300 can provide cooling in the form of 100 percent sensible, 100 percent latent, or any combination thereof. The DE-IDEC 1320 uses some portion of outdoor air 1325 with equal exhaust air 1328 to reject the heat load outside of the building 1310. The DE-IDEC 1320 itself can sit inside or outside of the building envelope because it has no wet surfaces and the liquid streams 1334, 1338 are closed loop. This makes system 1300 acceptable for indoor use and for placement of cooler 1320 inside the building 1310. The water source (or coolant source, not shown) for water or coolant 1334 is not required to be potable, and the system 1300 is compact enough to be acceptable by building managers. The electricity usage is much less than that of typical vapor compression systems or units (e.g., less than 0.2 kW/ton peak compared with 1.2 kW/ton typical for conventional compression units).

The regenerator 1340 is another of the significant components to the operation of the system 1300. This unit 1340 takes the weakened desiccant from the DE-IDEC 1320 and applies heat with boiler 1342 (see list of heat sources below) to drive off the moisture contained in the desiccant 1338. The result is a desiccant 1338 that has higher salt concentration and can be re-used by the DE-IDEC 1320 (e.g., in the membrane contained/defined flow channels adjacent to supply inlet air 1325, 1326). A list of heat sources suitable for desiccant regeneration may include: (a) gas or other fossil fuel; (b) solar heat; (c) waste heat from any waste heat stream such as combine heat and power plant; and (d) waste heat from a condenser unit originating from a vapor compression cycle.

Figure 14:
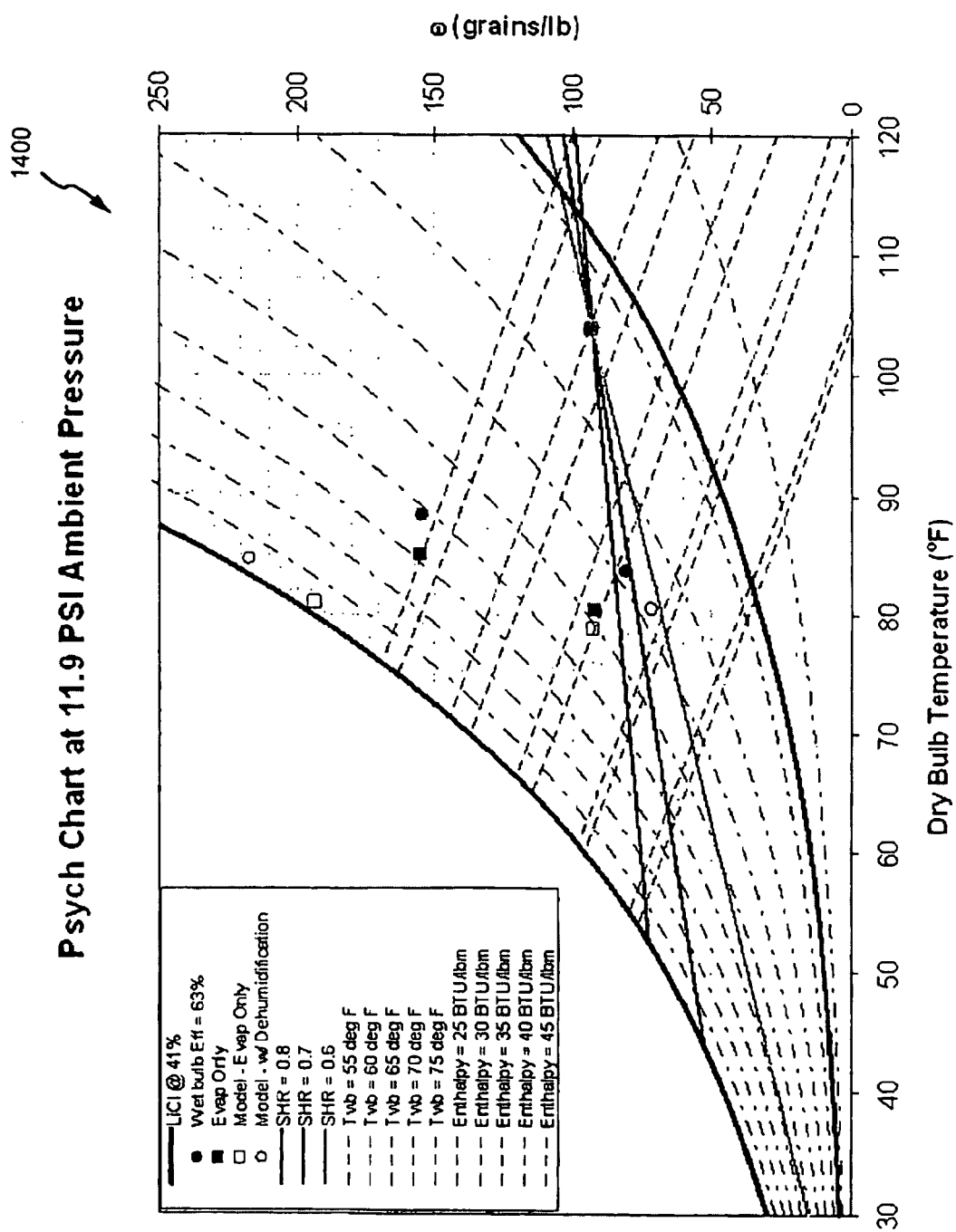
FIG. 14 is a psychrometric chart providing results of one test of a prototype fabricated similar to the embodiment of FIG. 4 with the stack assembly of FIG. 2.

The inventors performed a test of a prototype fabricated similar to the cooler shown in FIG. 4 with a stack assembly such as shown in FIG. 2. FIG. 14 provides results of the testing for this proof of concept prototype that was constructed and tested at 104° F. and 93 grains/lb inlet air. The prototype was tested with and without desiccant flow, but with membranes provided to define liquid desiccant flow channels. Without the desiccant flow, the indirect evaporative cooler had a wet-bulb effectiveness of 73%. When desiccant was turned on (with 41% LiCl solution as the desiccant), the effectiveness was 63% and had 12 grains/lb of dehumidification. This resulted in a sensible heat ratio of 0.73. The prototype did not reach model expectations as explained above, and this was likely due to prototype defects creating non-uniform air, water, and desiccant flow distribution.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope. The above description concentrated or stressed designs of heat/mass transfer assemblies for use in providing unique indirect evaporative coolers. Those skilled in the art will recognize that the coolers described can readily be included in more complete HVAC systems for residential and commercial use. Such HVAC systems would include plumbing and components to circulate liquid desiccant to and from the cooler at desirable and controllable flow rates. These systems would also include a regenerator for the desiccant (e.g., one that heats the liquid desiccant to remove absorbed water such as heat provided by solar panels, electrical heaters, or the like). The regenerator also includes a sump and lines for recovering potable water from the desiccant and storage would be provided for the desiccant prior to it being pumped or fed to the cooler. Portions of the system that come into contact with the desiccant typically would be fabricated of corrosion resistant materials such as certain metals or, more typically, plastics. The HVAC system would also include ducting and other components such as fans or blowers for moving the return air from the building through the cooler and back to the cooled spaces, for moving make up air through the cooler and into the cooled spaces, and for discharging any purge or exhaust air. A coolant supply system with piping and pumps/valving (as necessary) would also be provided to provide coolant such as potable water to the cooler stacks (e.g., channels between membranes and separation walls).

The embodiments shown typically discussed ongoing use of the liquid desiccant to dehumidify the supply or process air. However, in many operating conditions, the cooler may be operated without desiccant flow, and these operating conditions may be considered "free evaporative cooling" conditions (or zones on a psychrometric chart). "Free cooling" is exemplified by cooling efficiency so high that the cost of energy to run the system is of no consequence. For example, cooling without drying/dehumidifying may be performed by coolers described herein when humidity ratio is below about 80 (and the dry bulb temperatures are above 60° F.) while cooling and drying may be required above this humidity ratio at which point the cooler can be operated with flowing liquid desiccant. Such "free" cooling is practical relatively large numbers of days in less humid areas of the world (such as the southwest portion of the United States).

Embodiments of an indirect evaporative cooler according to the above description and attached figures can be provided as a single unit that provides an integral heat and mass transfer device utilizing a number of separation walls. The transfer device or assembly uses membrane containment and air flows do not come in direct contact with desiccant or water (coolant). The coolers use evaporative cooling (e.g., of water from the air flows across the membranes) to drive heat and mass exchange, with heat being transferred through the separation walls between liquid desiccant and coolant. The heat exchange is between two counter and/or cross flowing air streams. The mass exchange, such as during dehumidification, is generally the transfer of water vapor from the inlet supply air or process air through a water molecule-permeable membrane to a liquid state (e.g., to absorption by the liquid desiccant). The evaporative section of the coolers drives heat through the separation wall and expels that heat by evaporation from the coolant/water to an air stream (e.g., again water vapor is transferred through the permeable membrane but to a vapor state in the exhaust or counter/cross flow airstream).

The invention claimed is:

1. An indirect evaporative cooler for cooling a stream of inlet supply air from a first temperature to a second, lower temperature using a stream of liquid coolant and a stream of exhaust or purge air, comprising:
 a first flow channel for receiving the stream of inlet supply air;
 a second flow channel adjacent to the first flow channel and for receiving the stream of exhaust air at a temperature lower than the first temperature, wherein the second flow channel is defined in part by a sheet of a membrane at least partially permeable to water vapor, wherein the stream of liquid coolant flows on a side of the membrane opposite the second flow channel, and wherein the liquid coolant transfers mass as vapor through the membrane to the stream of exhaust air in response to receiving heat transferred from the stream of inlet supply air in the first flow channel; and
 a separation wall spaced apart from the sheet of membrane defining a liquid coolant flow channel for the stream of liquid coolant, the separation wall comprising a material impermeable to the liquid coolant and conductive of the heat from the stream of inlet supply air.

2. The cooler of claim 1, further comprising a second sheet of the membrane spaced apart from separation wall on a side opposite the first sheet of the membrane, the second sheet defining in part the first flow channel and the second sheet of the membrane and the separation wall defining a desiccant flow channel for receiving a stream of liquid desiccant, and wherein water vapor is transferred from the stream of inlet supply air through the second sheet of the membrane to the stream of liquid desiccant.

3. The cooler of claim 2, wherein the membrane of the first and second sheet resists flow of the liquid coolant and the liquid desiccant through the membrane, whereby the liquid desiccant and the liquid coolant are contained from flowing into the first and second flow channels, respectively.

4. The cooler of claim 3, wherein the liquid desiccant comprises a salt solution and the liquid coolant comprises water.

5. The cooler of claim 4, wherein the liquid desiccant is a weak desiccant.

6. The cooler of claim 1, wherein the exhaust air comprises a portion of the stream of inlet supply air entering the second flow channel at about the second, lower temperature.

7. The cooler of claim 1, wherein the stream of inlet supply air flows in a first direction in the first flow channel and the stream of exhaust air flows in a second direction in the second flow channel, the second direction being in at least one of cross or counter to the second direction.

8. A mass and heat transfer assembly for use in an evaporative cooler, comprising:
 a first stack comprising an upper membrane, a lower membrane, and a separation wall between the upper and lower membranes, the upper and lower membranes being permeable to water in vapor form and the separation wall being substantially impermeable to liquid and vapor;
 a second stack comprising an upper membrane, a lower membrane, and a separation wall between the upper and lower membranes, the upper and lower membranes being permeable to water in vapor form and the separation wall being substantially impermeable to liquid and vapor; and
 a third stack comprising an upper membrane, a lower membrane, and a separation wall between the upper and lower membranes, the upper and lower membranes being permeable to water in vapor form and the separation wall being substantially impermeable to liquid and vapor;
 wherein the first stack and second stack are spaced apart to define a flow channel for receiving a first stream of air and wherein the second and third stack are spaced apart to define a flow channel for a second stream of air.

9. The assembly of claim 8, wherein the first, second, and third stacks comprise a set of stacks and wherein the assembly further comprises two or more of the sets of stacks defining a plurality of parallel ones of the flow channels for the first stream of air and for the second stream of air.

10. The assembly of claim 8, wherein the first stream of air and the second stream of air flow in cross directions in the flow channels.

11. The assembly of claim 10, wherein the first stream of air and the second stream of air flow in counter directions in the flow channels.

12. The assembly of claim 8, further comprising a divider in the flow channel between the first and second stack and a divider in the flow channel between the second and third stack, wherein the dividers are configured to maintain a spacing of the membranes of the stacks and to allow flow of the first and second streams of air.

13. The assembly of claim 8, further comprising:
 in the first stack, liquid coolant flowing between the upper membrane and the separation wall and liquid desiccant flowing between the separation wall and the lower membrane;
 in the second stack, liquid desiccant flowing between the upper membrane and the separation wall and liquid coolant flowing between the separation wall and the lower membrane; and
 in the third stack, liquid coolant flowing between the upper membrane and the separation wall and liquid desiccant flowing between the separation wall and the lower membrane.

14. The assembly of claim 13, wherein the liquid coolant comprises water, the liquid desiccant comprises a salt solution, and the membranes each comprise a material permeable to water molecules.

15. A method of conditioning a process air, comprising:
 first directing the process air through a first flow channel;
 second directing a stream of a liquid desiccant adjacent a wall of the first flow channel, the liquid desiccant being separated from the process air in the first flow channel by a membrane that contains the liquid desiccant and allows water vapor from the process air to flow into the liquid desiccant, whereby the process air is dehumidified;

concurrently with the first and second directing, third directing a stream of purge air through a second flow channel proximate to the first flow channel, the purge air being at a temperature lower than at least a portion of the process air; and concurrently with the first, second, and third directing, fourth directing a stream of liquid coolant adjacent a wall of the second flow channel, the liquid coolant being separated from the purge air in the second flow channel by a membrane that contains the liquid coolant and allows vapor from the liquid coolant to flow into the purge air, whereby heat is released from the liquid coolant and the process air is cooled concurrent with the dehumidification.

16. The method of claim 15, wherein the stream of purge air is directed in a direction at least partially counter to a direction the process air is directed through the first flow channel.

17. The method of claim 16, wherein the stream of purge air comprises a portion of the process air after the directing through the first flow channel.

18. The method of claim 15, wherein the liquid coolant is water and the liquid desiccant is a weak desiccant comprising a salt solution and wherein the membrane contains the salt solution from flowing into the first flow channel.

19. An indirect evaporative cooler for cooling a stream of inlet supply air from a first temperature to a second, lower temperature using a stream of liquid coolant and a stream of exhaust or purge air, comprising:

a first flow channel for receiving the stream of inlet supply air; and a second flow channel adjacent to the first flow channel and for receiving the stream of exhaust air at a temperature lower than the first temperature;

wherein the second flow channel is defined in part by a sheet of a membrane at least partially permeable to water vapor, wherein the stream of liquid coolant flows on a side of the membrane opposite the second flow channel, and wherein the exhaust air comprises a portion of the stream of inlet supply air entering the second flow channel at about the second, lower temperature.

20. An indirect evaporative cooler for cooling a stream of inlet supply air from a first temperature to a second, lower temperature using a stream of liquid coolant and a stream of exhaust or purge air, comprising:

a first flow channel for receiving the stream of inlet supply air; and a second flow channel adjacent to the first flow channel and for receiving the stream of exhaust air at a temperature lower than the first temperature;

wherein the second flow channel is defined in part by a sheet of a membrane at least partially permeable to water vapor, wherein the stream of liquid coolant flows on a side of the membrane opposite the second flow channel, and wherein the stream of inlet supply air flows in a first direction in the first flow channel and the stream of exhaust air flows in a second direction in the second flow channel, the second direction being in at least one of cross or counter to the second direction.

* * * * *